INVENTOR
DAVID J. PLUMPE
BY
B. L. Zangwill
ATTORNEY

INVENTOR
DAVID J. PLUMPE

BY
B. L. Zangwill
ATTORNEY

AUTOMATIC GAIN CONTROL SIGNAL TRANSLATING SYSTEM

Filed July 31, 1962 5 Sheets-Sheet 3

INVENTOR

DAVID J. PLUMPE

BY

B. L. Zangwill

ATTORNEY

AUTOMATIC GAIN CONTROL SIGNAL TRANSLATING SYSTEM

Filed July 31, 1962 5 Sheets-Sheet 4

INVENTOR
DAVID J. PLUMPE
BY
B. L. Zangwill
ATTORNEY

Nov. 24, 1964 D. J. PLUMPE 3,158,818

AUTOMATIC GAIN CONTROL SIGNAL TRANSLATING SYSTEM

Filed July 31, 1962 5 Sheets-Sheet 5

INVENTOR

DAVID J. PLUMPE

BY

B. L. Zangwill

ATTORNEY

United States Patent Office 3,158,818

Patented Nov. 24, 1964

3,158,818

AUTOMATIC GAIN CONTROL SIGNAL TRANSLATING SYSTEM

David J. Plumpe, Falls Church, Va., assignor to the United States of America as represented by the Secretary of the Navy Filed July 31, 1962, Ser. No. 213,837

3 Claims. (Cl. 330—29)

(Granted under Title 35, U.S. Code (1952), sec. 266)

The invention described herein may be manufactured and used by or for the Government of the United States of America for governmental purposes without the payment of any royalties thereon or therefor.

This invention relates to a signal normalizing amplifier and more particularly relates to a device for amplifying an electrical signal such that, as the input signal is varied over a wide range of amplitudes, the output varies over a very narrow amplitude range.

Signal normalizing amplifiers are used to compress the level of electrical signals having a wide dynamic range to a level suitable for recording on media having a limited dynamic range. The electrical signals provided by low frequency hydrophones, such as those used to detect underwater sound in sonar systems, vary over a wide range of amplitudes. It is frequently desirable to record these signals on magnetic tape, which will not record and reproduce signals faithfully which vary over a wide amplitude range. A signal normalizing amplifier is essentially an amplifier which has automatic stepped gain control which maintains the output signal within the desired amplitude limit by changing the gain level in predetermined steps and also indicates the steps of its own gain for use in determining the true amplitude of the input signal.

In the past the gain of the amplifier was varied by an operator who observed the output level and manually operated a step attenuator to keep this level within the required range as the input level varied. The variation of the gain frequently created large switching transients which appeared at the output. Also, the amplifier stages have been bulky and difficult to use. Accordingly, it is the principal object of this invention to provide a normalizing amplifier which is entirely automatic in operation.

It is a further object of this invention to provide an amplifier with an accurately stepped gain control for near precise data recording and with flexibility in its maximum gain which is determined solely by the number of stages used and the noise figure. The actual gain per stage and switching threshold can be changed to different values merely by changing the values of a few resistors.

It is another object of this invention to provide a signal normalizing amplifier in which no gain is provided after the point at which the switching transients appear, thus minimizing such transients.

It is a still further object of this invention to provide a sturdy and compact signal normalizing amplifier. Preferably this amplifier will be entirely composed of semiconductor circuitry.

Other objects and many of the attendant advantages of this invention will be readily appreciated as the same become better understood by reference to the following detailed description when considered in connection with the accompanying drawings wherein.

Figure 1:
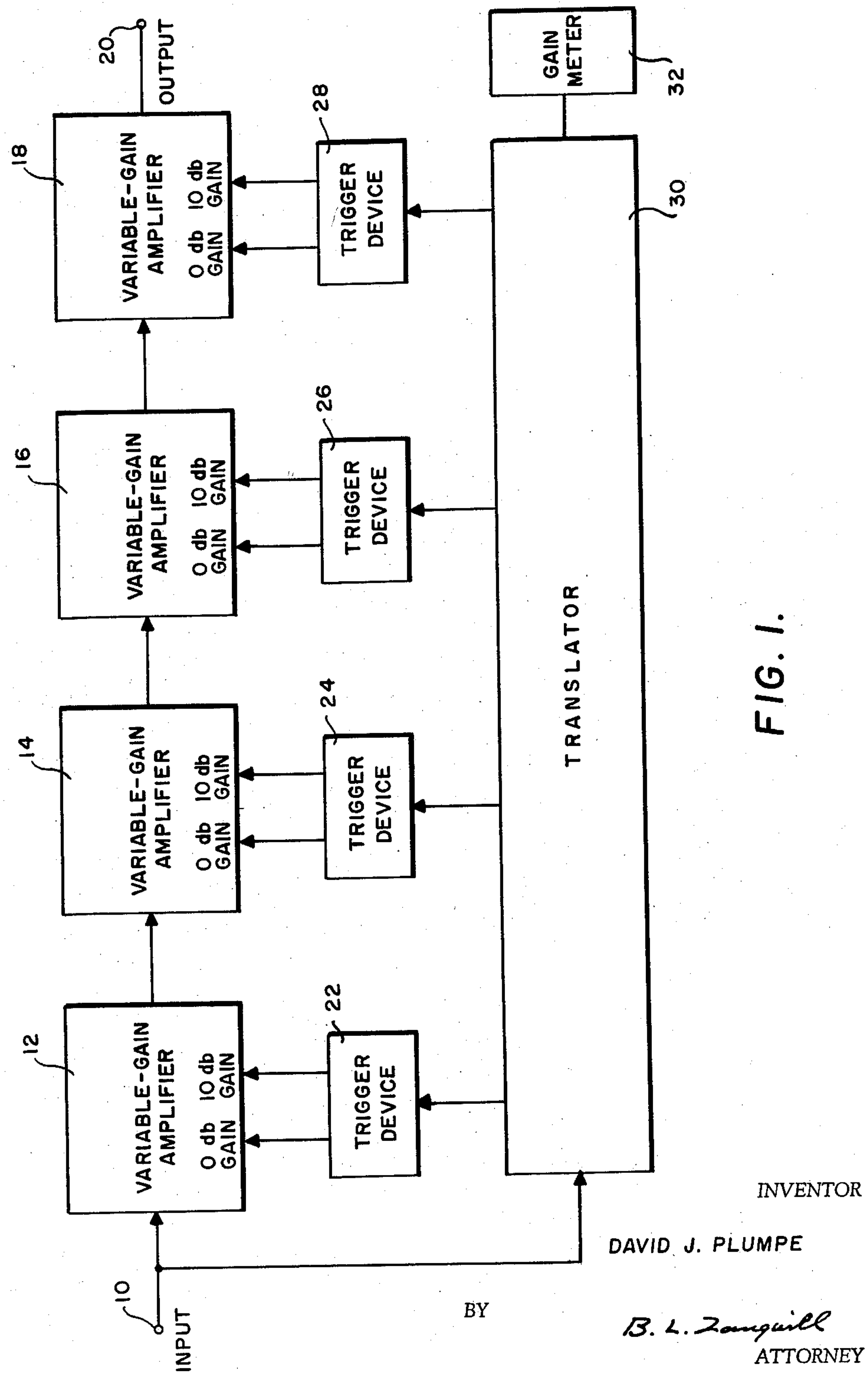
FIG. 1 is a block diagram of a signal normalizing amplifier according to the invention.

Referring now in particular to FIG. 1 of the drawings, a signal normalizing amplifier which can provide 40 decibels of gain is shown, having input terminal 10 for receiving a low voltage to be amplified by the four variable gain amplifiers, 12, 14, 16 and 18 of the type having at least two operative levels of gain which are connected in series with terminal 10 so as to provide an amplified signal output having approximately an amplitude of one volt R.M.S. (root mean square) to the output terminal 20. The four variable gain amplifiers 12, 14, 16 and 18 are each operable at two discrete levels of gain: zero decibels or 10 decibels. These variable gain amplifiers 12, 14, 16, and 18 are triggered from one gain level to the other by the four trigger devices 22, 24, 26, and 28 respectively. A translator 30 which includes a series of amplifiers which may be of the type shown in FIG. 2 as level amplifier 48. This translator which is electrically connected to the input terminal 10 provides pulses to the trigger devices 22, 24, 26, and 28 which are a measure of the amplitude of the input signal at terminal 10.

As the input level is increased from zero volts to one volt R.M.S., the translator will energize each of the trigger devices 22, 24, 26, and 28 which will switch each of the variable gain amplifiers 12, 14, 16, and 18 to the 10 decibel gain state. Initially, then, the signal normalizing amplifier will provide a gain of 40 decibels to the signal applied to terminal 10 and appearing at terminal 20. This gain will be indicated on gain meter 32 which is electrically connected to translator 30. When the input signal reaches an amplitude of 8 millivolts the output signal at terminal 20 will have an amplitude of 0.8 of a volt, and the translator 30 will energize the trigger device 28 so as to switch the last variable gain amplifier 18 from the 10 decibel gain level to the zero decibel gain level. The gain meter 32 will now indicate a 30 decibel gain, and the output signal at terminal 20 will be approximately 0.25 volt. As the input is further increased and the output signal again reaches 0.8 volt, the translator will energize trigger device 26 which will switch variable gain amplifier 16 from the 10 decibel gain level to the zero decibel gain level, leaving the signal normalizing amplifier with a gain of 20 decibels which will in turn be indicated by gain meter 32. This process will continue with increasing input amplitude until all stages are at zero decibels gain and the output equals the input. If the input is now decreased to zero volts, the opposite will take place; the amplifier stages will switch individually from zero decibels to 10 decibels gain until all stages are at 10 decibels gain and the overall system again provides 40 decibels gain.

It will be noted that any decrease in gain always originates in the highest signal level stage and progresses toward the input; conversely, any increase in gain begins near the input and progresses toward the output. This serves two purposes; first, this retains the best possible noise figure, that of the first stage; and second, as there is no gain following the stage being gated, any possible switching transients are not amplified in succeeding stages. The four decibel hysteresis is maintained between the minimum and maximum switching levels to insure that the amplifier will not constantly be changing gain for a slightly varying signal level near the threshold. That is, when the output exceeds 0.8 volt the last variable gain amplifier will be switched from the 10 decibel gain level to the zero decibel gain level, and when the output falls below 0.15 volt the last variable gain amplifier will be switched from the zero decibel gain level to the 10 decibel gain level.

Figure 2:
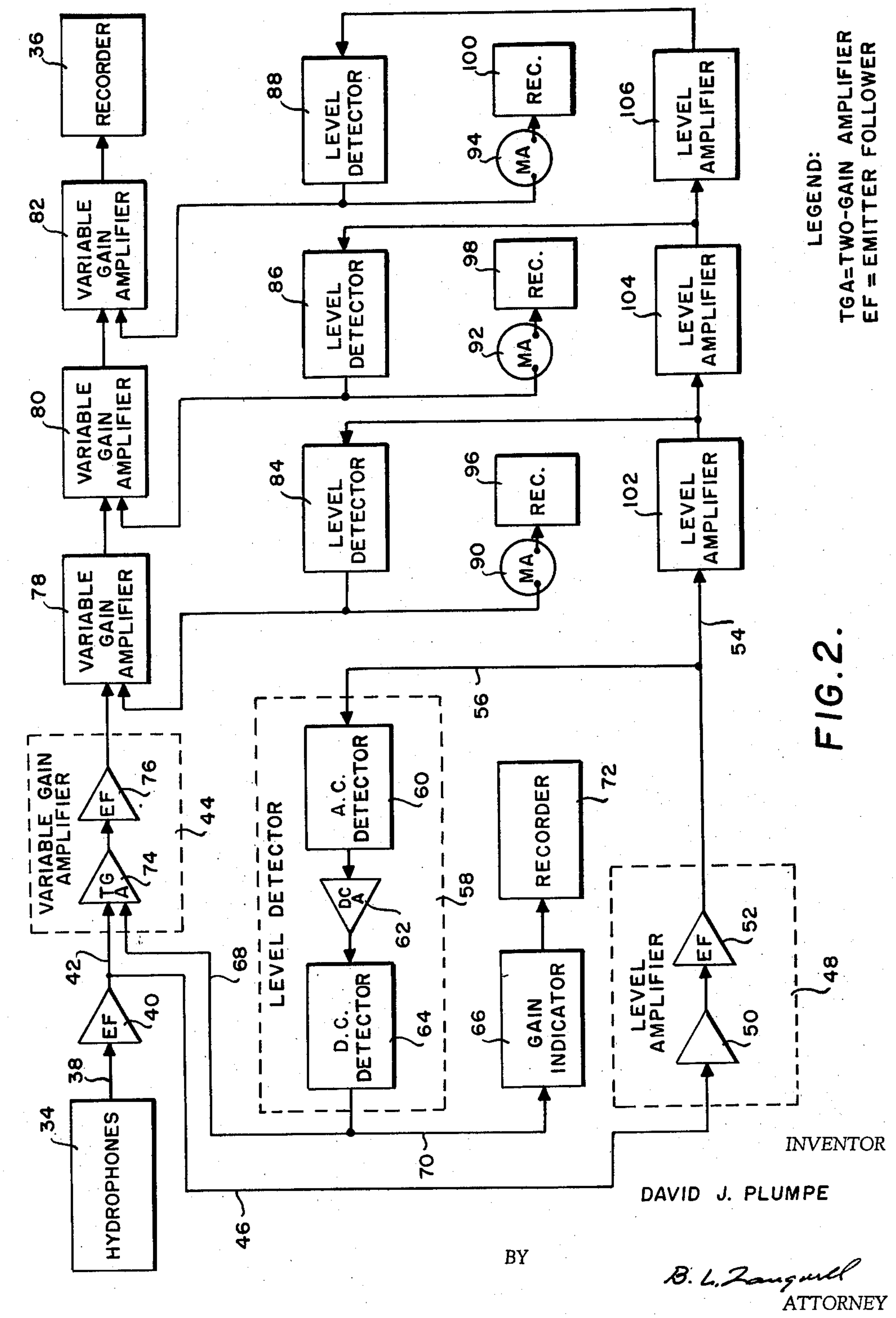
FIG. 2 is a more detailed block diagram of the signal normalizing amplifier of this invention, showing the individual stages of the amplifier and the components in the first stage.

A more detailed block diagram of an embodiment of the invention is shown in FIG. 2 in which a low amplitude signal which is developed by the hydrophone or hydrophone array 34 is normalized and recorded by recorder 36. The electrical signals which are developed by the hydrophone 34 in response to underwater sound are transmitted over conductor 38 to the emitter follower amplifier 40. The input impedance of emitter follower 40 is adjusted so as to match the internal impedance of the source, which in this case is the hydrophone 34. The output from the emitter follower 40 is passed by conductor 42 to the first variable gain amplifier indicated generally at 44 and also over conductor 46 to the first level amplifier which is a conventional amplifier labeled "level" to indicate its function and which is indicated generally at 48. This level amplifier has two stages 50 and 52. The input signal is amplified by amplifier stage 50 and is conducted to emitter follower 52 which isolates amplifier stage 50 from loading effects of conductors 54 and 56. The level amplifier has a gain of 10 decibels and therefore provides an output signal on conductor 54 which is equal to the signal output of one stage of the variable gain amplifiers when that stage is in its high gain state.

Conductor 56, which is electrically connected to conductor 54, passes this signal to level detector 58. The level detector 58 determines the amplitude of the signal received by conductor 56, and controls the gain of variable gain amplifier 44 accordingly. The level detector 58 includes three main units: first, A.C. detector 60 which is connected to conductor 56 and converts the A.C. input signal received by conductor 56 to a D.C. voltage level; second, D.C. amplifier 62 which receives the D.C. signal from A.C. detector 60, conducts and amplifies it; and third, D.C. detector 64 which is connected to amplifier 62 and which provides an output that is indicative of the signal level received from 62 to the variable gain amplifier 44 and the gain indicator 66.

If the output signal of level amplifier 48 increases to 0.8 volt the level detector 58 which receives this voltage through conductor 56 will deliver a positive voltage to variable gain amplifier 44 through conductor 68 to switch this variable gain amplifier to the zero decibel gain state. At the same time this voltage will be delivered to gain indicator 66 through conductor 70 which will provide an indication of the low voltage gain state to recorder 72. Conversely if the output voltage from level amplifier 48 falls below 0.15 volt the level detector 58, which receives this voltage through conductor 56, will provide a relatively low negative voltage output to variable gain amplifier 44 through conductor 68 to switch this variable gain amplifier to its 10 decibel gain state. At the same time this low voltage will be delivered to gain indicator 66 through conductor 70 which will provide an indication to recorder 72 of the high gain state.

The variable gain amplifier 44 includes the two-gain amplifier 74 which receives the signal input from the emitter follower 40 through the conductor 42 and amplifies it either by 10 decibels or zero decibels according to whether it receives a negative voltage or a positive voltage from the level detector through conductor 68. The output from the two-gain amplifier 74 an amplifier operable at a selected one of two predetermined levels of gain is connected to the input of emitter follower 76 which isolates amplifier 74 from loading effects on the output of variable-gain amplifier 44.

Variable gain amplifiers 78, 80, and 82 are connected in series with variable gain amplifier 44 and are constructed in the same manner; level detectors 84, 86, and 88 are connected to the variable gain amplifiers 78, 80, and 82 respectively and are constructed in the same manner as level detector 58 and control the gain of their respective variable gain amplifiers. Gain indicators 90, 92, and 94 receive a voltage from the level detectors 84, 86, and 88 which is indicative of the gain level of their respective amplifiers and in turn provide an indication to recorders 96, 98, and 100 respectively. Level amplifiers 102, 104, and 106 are connected in series with level amplifier 48 and are of similar construction; they are connected to level detectors 84, 86, and 88 respectively. They each amplify the input signal by 10 decibels and pass this signal both to their respective level detectors and to the next level amplifier in the series.

It can be seen that when the output amplitude level of any of the level amplifiers 48, 102, 104, and 106 rises above 0.8 volt the variable gain amplifier corresponding to that level amplifier will be switched from the 10 decibel gain level to the zero decibel gain level and when the output of any of the level amplifiers 48, 102, 104, and 106 falls below 0.15 volt the corresponding variable gain amplifier will be switched from the zero decibel gain level to the 10 decibel gain level. In this way as the amplitude of the input signal increases, the gain of the signal normalizing amplifier will decrease in 10 decibel steps, originating at the highest level variable gain amplifier stage and progressing towards the input of the signal normalizing amplifier; conversely as the input signal decreases, the gain of the signal normalizing amplifier will increase in 10 decibel steps originating from the input and progressing toward the output. It is obvious that the gain indications from the various stages could be recorded on the final output recorder or could be observed visually. Also the input signal need not originate with hydrophones but may originate in many other apparatus such as recorders and the output need not be utilized for a recorder such as 36 but may be utilized in many other applications such as in spectrum analysis.

Figure 3:
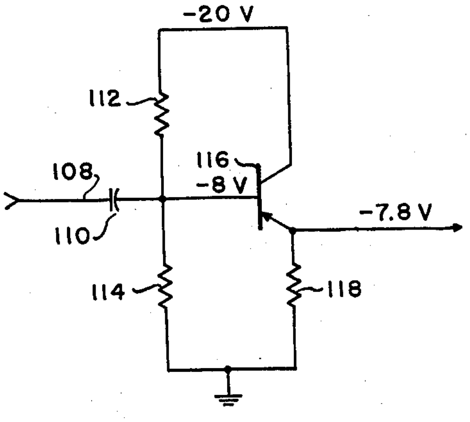
FIG. 3 is a schematic circuit diagram of an emitter follower as used in an embodiment of this invention.

A schematic circuit diagram of an emitter follower amplifier suitable for use in the input of the signal normalizing amplifier is shown in FIG. 3. The input signal is applied to conductor 108 which is connected to one end of capacitor 110. This capacitor isolates the emitter follower from any D.C. component on the input signal and may have a value of capacitance of 100 microfarads. The other end of the capacitor 110 is connected to one end of resistor 112, one end of resistor 114 and to the base of PNP transistor 116. The other end of resistor 112 is connected to a D.C. voltage source and to the collector of transistor 116. The D.C. voltage source should have a value of approximately a negative 20 volts. The other end of resistor 114 is grounded.

The emitter of transistor 116 is connected to one end of resistor 118; the other end of resistor 118 is grounded. The output signal is taken from the emitter of transistor 116. Transistor 116 may be a PNP transistor of the type 2N1379. Resistor 118 should be approximately 10 kilo-ohms. The input impedance of the emitter follower amplifier is approximately equal to the value of resistance that resistor 112 and resistor 114 would provide when connected in parallel. This input impedance should be approximately 10 kilo-ohms. Resistor 112 may have a value of 27 kilo-ohms and resistor 114 may have a value of 18 kilo-ohms. The ratio of resistor 112 to 114 primarily determines the biasing level of the transistor 116 and should remain constant for stability. While input impedance of the system can be adjusted over a limited range by varying the values of resistor 112 and resistor 114, resistor 114 should not exceed 100 kilo-ohms or instability may result.

Figure 4:
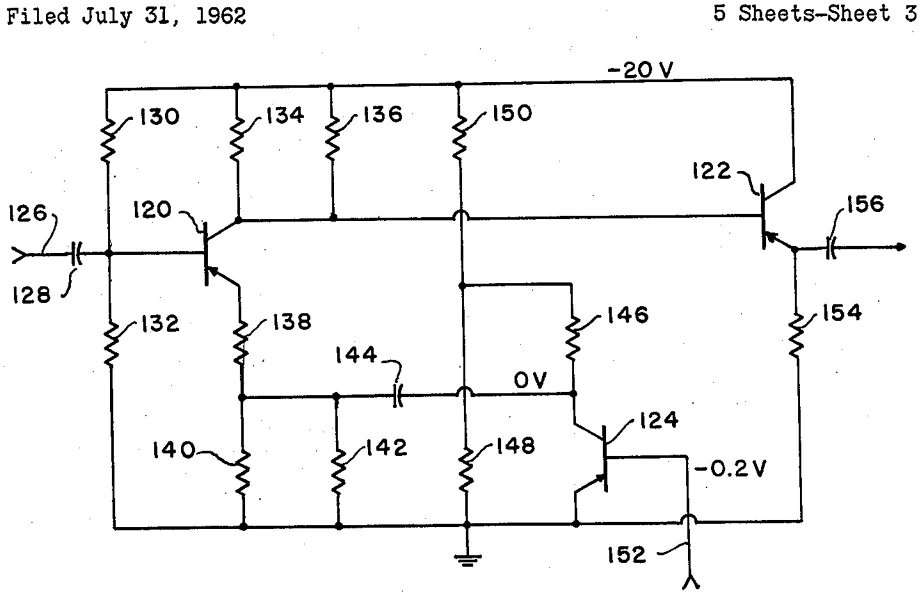
FIG. 4 is a schematic circuit diagram of the variable-gain amplifier stage employed in an embodiment of this invention.

A schematic circuit diagram of each of the variable gain amplifiers 44, 78, 80, and 82 is shown in FIG. 4. Each of these amplifiers is identical. The variable gain amplifier consists of three PNP transistors 120, 122, and 124 which are employed in an amplifier, an emitter follower, and a switch respectively. Switching transistor 124 varies the gain of amplifier transistor 120 between zero decibels gain and 10 decibels gain by shunting out part of the emitter resistance of transistor 120.

The signal input to the variable gain amplifier is applied to 126 which is connected to one plate of capacitor 128 which removes any D.C. component of the input signal. The other plate of capacitor 128 is connected to the base of transistor 120 to one end of resistor 130 and to one end of resistor 132. The other end of resistor 130 is connected to a negative 20 volt D.C. power source and the other end of resistor 132 is grounded. The capacitor 128 has a value of approximately 100 microfarads capacitance; resistor 130 may have a value of 75 kilo-ohms; and resistor 132 may have a value of approximately 47 kilo-ohms. Amplifier transistor 120 may be of the type 2N1379.

The collector of amplifier transistor 120 is connected to one end of resistor 134, one end of resistor 136, and to the base of emitter follower transistor 122. The other end of resistor 134 and resistor 136 and the collector of transistor 122 are connected to the negative 20 volt D.C. power source. Resistor 134 may have a value of 4,640 ohms and resistor 136 may have a value of 30 kilo-ohms. The emitter of transistor 120 is connected to one end of resistor 138 which may have a value of 1,210 ohms. The other end of resistor 138 is connected to resistor 140 which may have a value of 4,640 ohms. The other end of resistor 140 is connected to ground.

It can be seen that the gain of the amplifier which employs transistor 120 will be approximately equal to the resistance ratio of the resistors $$\frac{R134\alpha}{R138+R140}$$

where alpha represents the forward short circuit current amplification factor. Resistor 136 is placed in parallel with resistor 134 and has a relatively large value of resistance of 30 kilo-ohms. Resistor 142 is placed in parallel with resistor 140 and has a relatively large value of resistance of 47 kilo-ohms. While these two values of resistance do not appear in the above equation for the approximate gain of the amplifier they play a small part and may be used for sensitive adjustment of the gain. The value of resistors 134, 138, and 140 are chosen so as to provide zero decibels of gain. The zero decibel gain level is actually achieved through a finer adjustment of resistors 136 and 142. The electrical point in the circuit which is between the one end of resistors 138 and 140 is connected to one end of capacitor 144. The other end of capacitor 144 is connected to the collector of impedance switching transistor 124 and serves to couple the impedance switching amplifier to the amplifying stage of the variable gain amplifier. This capacitor may have a value of 150 microfarads. The other end of capacitor 144 and the collector of transistor 124 are also connected to the resistor 146 which may have a value 6,810 ohms. The other end of resistor 146 is connected to one end of resistor 148 and to one end of resistor 150. The other end of resistor 148 which may have a value of 470 ohms is grounded; the other end of resistor 150, which may have a value of approximately 400 kilo-ohms, is connected to the negative 20 volt D.C. power supply. The value of resistance of resistor 150 is selected to minimize switching transients.

It can be seen that resistors 146 and 148 will also play a part in determining the actual gain of the amplification stage of this variable gain amplifier. The actual gain of the amplification stage in the low gain stage is given by the following equation in which the numbers represent the resistance of their respective resistance and $\alpha$ is the forward short circuit current amplification factor:

$$\frac{R134\cdot R136}{R134+R136}\times\frac{R140\cdot R142+(R140+R142)(R146+R148)\alpha}{R140\cdot R142\,(R138+R146+R148)+R138\,(R140+R142)\,(R146+R148)}$$

The emitter of transistor 124 is connected to ground so that this transistor will short resistors 140 and 142 when it is in its conducting state. The transistor is normally reverse biased. However, when transistor 124 receives a negative signal on its base through conductor 152 it is forward biased and resistors 140 and 142 are shorted so that the gain of the amplification stage is increased to approximately 10 decibels. This gain is approximately equal to the value of resistor 134 divided by the resistance of resistor 138 and multiplied by the forward short circuit current amplification factor of transistor 120. The actual gain of the amplifier in this state is given by the following equation in which the numbers represent the resistance of their respective resistors and is the forward short circuit current amplification factor:

$$\frac{R134R136\alpha}{(R134+R136)R138}$$

Resistors 146, 148, and 150 minimize switching transients by providing leakage current to capacitor 144 and transistor 124 when transistor 124 is reverse biased. This leakage current maintains the collector of switching transistor 124 at D.C. ground in both high and low gain conditions. If the collector of transistor 124 were to drift from ground, a step function would be generated upon the switching of the transistor due to the fact that an alternate path to ground would be formed through the transistor. This step function would be coupled to the amplifier stage through condenser 144 and would appear as a transient at the output.

The collector of emitter follower transistor 122 is connected to the negative D.C. voltage source and the emitter is connected to one end of 10 kilo-ohms resistor 154. The other end of resistor 154 is connected to ground. The base of transistor 122 is connected to the collector of transistor 120. The output from the variable gain amplifier is taken directly from the emitter of emitter follower transistor 122 through condenser 156.

Figure 5:
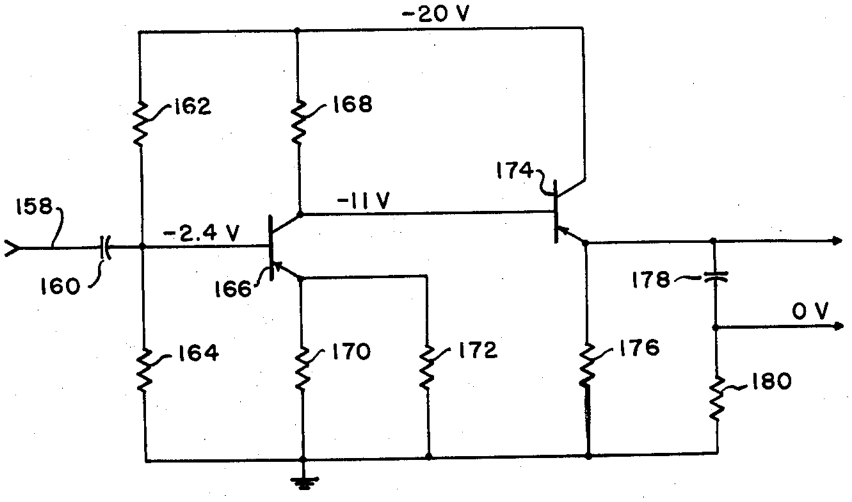
FIG. 5 is a schematic circuit diagram of the level amplifier stage employed in an embodiment of this invention.

A schematic circuit diagram of each of the level amplifiers used in FIG. 2 and designated 48, 102, 104, and 106 is shown in FIG. 5. Each level amplifier provides a gain of 10 decibels. This amplifier is not critical of gain, bandwidth or noise as it is only for the internal use of the system to provide a comparison signal for the level detector.

The input signal is applied to conductor 158 which is connected to one end of capacitor 160. Capacitor 160 removes any D.C. component of the signal and may have a value of capacitance of 150 microfarads. The other end of the capacitor is connected to one end of resistor 162 which has a value of 100 kilo-ohms, to one end of resistor 164 which has a value of 15 kilo-ohms, and to the base of transistor 166 which may be of type 2N414. The other end of resistor 162 is connected to a negative 20 volt D.C. voltage supply. The other end of resistor 164 is connected to ground. Resistor 168 is connected between the negative 20 volt D.C. power supply and the collector of transistor 166. It may have a value of 10 kilo-ohms. Resistor 170 is connected between the emitter of transistor 166 and ground. It may have a value 3.3 kilo-ohms. Resistors 162 and 164 determine the biasing of transistor 166. The gain provided by this transistor is approximately equal to the value of resistor 168 divided by the resistor 170 times the forward short circuit current amplification factor of transistor 166. A resistor 172 is connected in parallel with resistor 170 and may have a value of 15 kilo-ohms. This resistor provides a finer adjustment of the gain and is used to trim the gain to 10 decibels. The output of this transistor is taken directly from the collector and is applied to the base of transistor 174, which is connected as an emitter follower so as to reduce the output impedance of the amplifier to a value which is suitable for driving the next stage and which is suitable for driving the corresponding level detector.

The collector of transistor 174 is connected to the negative 20 volt D.C. power source. The emitter of this transistor is connected to the level amplifier of the next stage leading towards the output and also to one end of resistor 176 which may have a value of 10 kilo-ohms. The other end of resistor 176 is connected to ground. The emitter of transistor 174 is also connected to one plate of capacitor 178 which may have a value of 150 microfarads. The other end of capacitor 178 is connected to the corresponding level detector of that stage and also to one side of resistor 180. The other side of resistor 180 is connected to ground.

Figure 6:
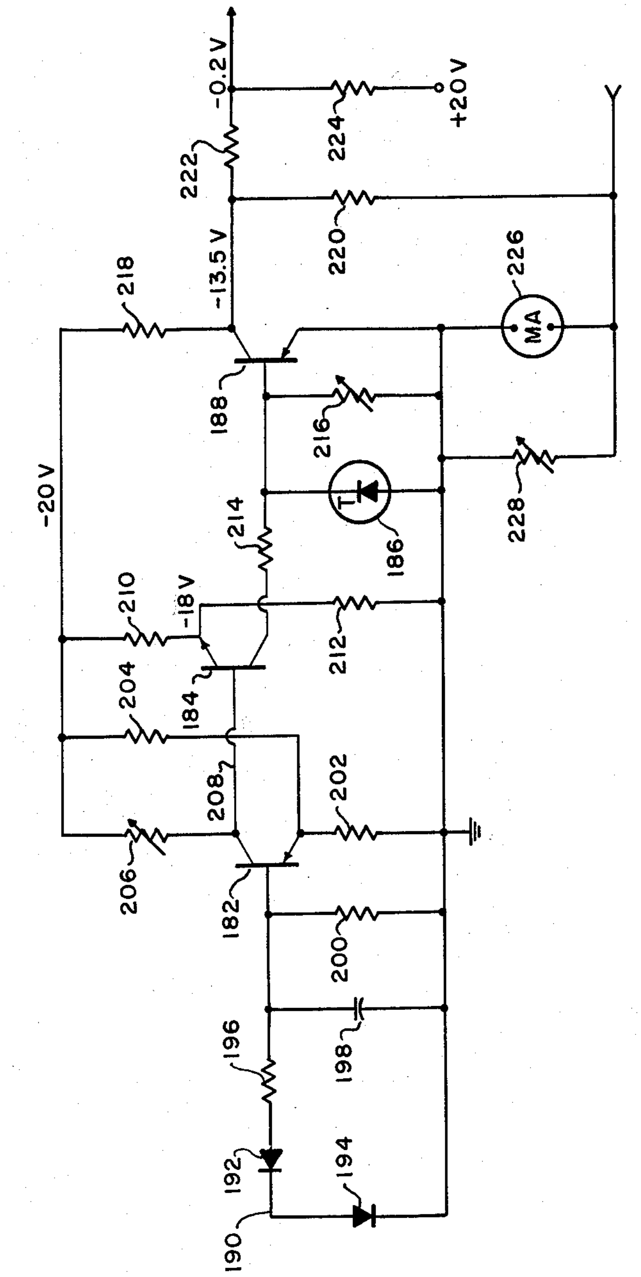
FIG. 6 is a schematic circuit diagram of the level detector stage employed in an embodiment of this invention.

A schematic circuit diagram of level detectors such as 58, 84, 86, and 88 in FIG. 2 and gain indicators such as 66, 90, 92, and 94 in the same figure are shown in FIG. 6. Each level detector receives a signal from the level amplifier, determines its amplitude, and controls the gain of the variable gain amplifier accordingly.

The level detector converts the A.C. input to a D.C. level, and amplifies this D.C. level in the transistor amplifier, employing transistors 182 and 184. The amplified D.C. level is then measured to determine whether or not the gain of the variable gain amplifier stage will be changed. The measuring is done by tunnel diode 186 and transistor 188.

The input signal from the corresponding level amplifier is applied to conductor 190 which is connected to the cathode of diode 192 and to the anode of diode 194. These diodes rectify the A.C. input signal. The anode of diode 192 is connected to one end of resistor 196; the cathode of diode 194 is connected to ground. The other end of resistor 196 and one end of capacitor 198 are connected together. The other end of capacitor 198 is connected to ground. Resistor 196 and capacitor 198 filter the rectified input signal. Diodes 192 and 194 may be of the type 1N96. Resistor 196 may have a value of 47 kilo-ohms and capacitor 198 may have a value of 150 microfarads.

The ends of resistor 196 and capacitor 198 which are connected together are also connected to one end of resistor 200 and to the base of transistor 182. The other end of resistor 200 is connected to the other end of capacitor 198 and ground so that resistor 200 is directly in parallel with capacitor 198. This applies the D.C. voltage, which is proportional to the D.C. input signal, to the amplifier portion of the level detector through the base of transistor 182. Resistor 200 may have a value of 100 kilo-ohms, and transistor 182 may be of the type 2N414.

Resistor 202, which has a value of 270 ohms resistance, is connected between emitter of transistor 182 and ground. Resistor 204 which has a value of 10 kilo-ohms is connected between the emitter of transistor 182 and a negative 20 volt D.C. power supply. Potentiometer 206, which has a maximum value of 50 kilo-ohms, is connected between the collector of transistor 182 and the negative 20 volt D.C. power supply. The amplified D.C. output from the transistor 182 is connected to the base of transistor 184 through conductor 208. A one kilo-ohm resistor 210 is connected between the emitter of NPN transistor 184 and the negative 20 volt power supply, and a 10 kilo-ohm resistor 212 is connected between the same emitter and ground. The output from transistor 184 is coupled to the measuring portion of the level detector through 1.8 kilo-ohm resistor 214 which is connected at one end to the collector of transistor 184.

The other end of coupling resistor 214 is connected to the cathode of tunnel diode 186, one end of one kilo-ohm potentiometer 216 and to the base of PNP transistor 188. The anode of tunnel diode 186, the other end of resistor 216, and the emitter of PNP transistor 188 are each grounded. A 4.7 kilo-ohm resistor 218 is connected between the collector of transistor 188 and the negative 20 volt D.C. power supply.

The D.C. amplifier stage draws a current through coupling resistor 214 which is proportional to the signal input level to the level detector but displaced somewhat by the reverse bias on transistors 182 and 184. The tunnel diode 186 and the transistor 188 of the measuring portion of the level detector are supplied by this current. When the input signal to the level detector state is less than 0.15 volt the tunnel diode 186 is operating on the first positive resistance portion of its characteristic curve. As the signal increases to 0.8 volt the operating point of the characteristic curve of the tunnel diode rises to its peak current value, and when 0.8 volt is exceeded the tunnel diode is switched over its negative resistance region into its high voltage low current state. When the input signal is below 0.8 volt the tunnel diode is operating at the low voltage end of its characteristic curve and the transistor 188 is not conducting.

However, when the tunnel diode 186 is switched from its high current low-voltage state to its low-current high-voltage state the transistor 188 is biased into saturation and its collector is pulled from a negative 13 volts to ground level. The step function transferred by this switching of transistor 188 is transferred to a positive voltage by the coupling network which includes resistors 220, 222, and 224. Resistor 220, which may have a value of 100 kilo-ohms resistance, and resistor 222, which may have a value of 10 kilo-ohms resistance, each have one of their ends connected to the collector of transistor 188. The other end of resistor 222 is connected to the variable gain amplifier which it controls, and to one end of resistor 224. The other end of resistor 224 is connected to a positive 20 volt D.C. voltage source. Resistor 224 may have a value of 27 kilo-ohms.

In the input to the level detector, resistor 196, capacitor 198 and resistor 200 provides a time constant sufficiently long to avoid switching on stray high amplitude signal pulses. Potentiometer 206 is a gain control for the D.C. amplifier stage of the level detector. The stage of the D.C. amplifier portion of the level detector which employs transistor 182 is normally cut off by the reverse bias supplied by the voltage divider formed by resistor 202 and resistor 204. This bias is approximately a negative 0.53 volt.

However, when the signal at the base of transistor 182 exceeds this bias the transistor conducts and draws current through potentiometer 206 and the base of transistor 184, which is employed in the second stage of the D.C. amplifier portion of the level detector. Transistor 184 is reverse biased in much the same manner as the first state. The emitter of this NPN transistor is held to approximately a negative 18 volts by the voltage divider consisting of resistor 210 and 212. This transistor will not conduct until its base is pulled from a negative 20 volts to a negative 18 volts. Coupling resistor 214 limits the current through tunnel diode 186 so as to prevent damage to this tunnel diode. Potentiometer 216 controls the switching level hysteresis of the level detector by shifting the slope of the tunnel diode load line. Potentiometer 206 is adjusted to determine the switching level of the level detector.

A milliammeter may be used to give a visual indication of the gain of the signal normalizing amplifier. When such a meter is used rather than a recorder, resistors 220 from each stage of the level detector are connected together at one end so as to add the current flowing from their respective measuring transistors 188. One terminal of milliammeter 226 is also connected to this junction of resistors 220. The other end of the milliammeter 226 is grounded. A potentiometer 228 is connected in parallel with the milliammeter and used to adjust its reading.

Similar circuitry could be used to control a voltage controlled oscillator or other device to provide gain indication signal suitable for recording on another channel of the same type as that used for recording the hydrophone signal. Thus the normalized signal and the gain would both be on the tape and would be available together for reproducing the hydrophone signal in its original form for data processing.

Figure 7:
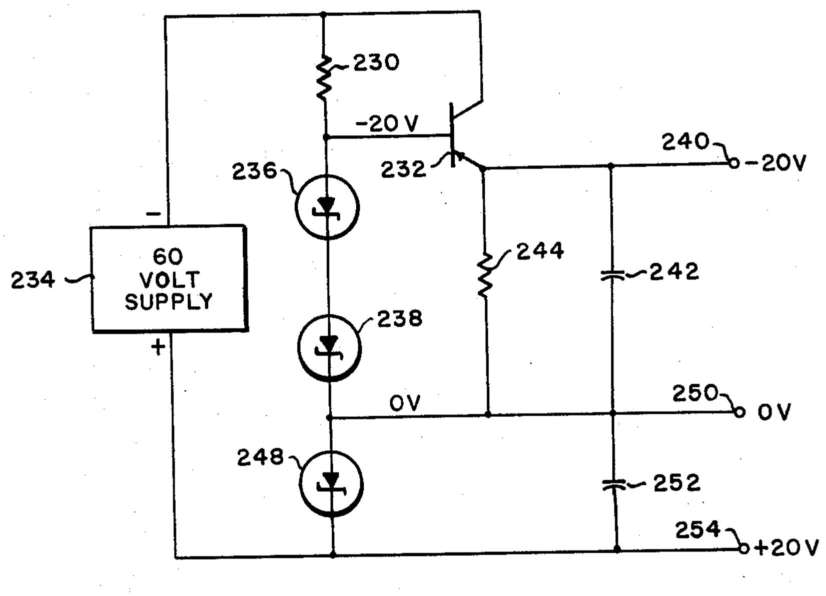
FIG. 7 is a schematic circuit diagram of a power supply suitable for use with the invention.

A schematic circuit diagram for a power supply suitable for use in this invention is shown in FIG. 7. This power supply adapts a standard 60 volt supply to provide the negative and positive 20 volt sources needed. Of course other power supplies could be used.

One end of resistor 230 and the collector of transistor 232 are connected to the negative pole of 60 volt power supply 234. The other end of resistor 230 is connected to the anode of Zener diode 236 and to the base of transistor 232. The cathode of Zener diode 236 is connected to the anode of Zener diode 238. A negative 20 volts is taken from the emitter of transistor 232 which is connected to 20 volt output terminal 240, to one plate of capacitor 242 and to one end of resistor 244. The cathode of Zener diode 238 is connected to the anode of Zener diode 248, to other end of resistor 244, to the other plate of capacitor 242 and to ground output terminal 250. The positive terminal of the 60 volt power supply 234 is connected to the cathode of Zener diode 248, to the other plate of capacitor 252, and to positive 20 volt output terminal 254. Resistor 230 may have a value of 2.2 kilo-ohms and resistor 244 may have a value of 3.9 kilo-ohms. The capacitors 242 and 252 should have values of approximately 100 microfarads each and are used to shunt out any A.C. component from the output of the power supply. The transistor 232 may be of the type 2N456. Zener diodes 236 and 238 which each have a reverse voltage drop of 10 volts may be of the type 1N758. Zener diode 248 which provides an additional 20 volt drop may be of type 1N1358.

The signal normalizing amplifier of this invention is flexible in that it may consist of practically any number of 10 decibel stages, the maximum number being limited only by the noise generated in the first stage. Also the gain of the individual stages may be altered simply. The times at which gain changes occur can be synchronized with clock pulses if this is suitable for the particular application. The signal normalizing amplifier itself is especially free of switching transients in its output since the switching always occurs at the last variable gain stage which will provide an appreciable gain and therefore the transient itself is not amplified. It requires no operator, is sturdy, reliable, compact and economical in use.

Obviously many modifications and variations of the present invention are possible in the light of the above teaching. It is therefore to be understood that within the scope of the appended claims the invention may be practiced otherwise than as specifically described.

What is claimed is:

1. A system for recording a signal having a range of amplitude greater than the response range of the recording medium comprising:
- an input terminal for receiving the signal;
- a plurality of variable gain amplifier means connected sequentially in series, the first variable gain amplifier means of said series being connected directly to said input terminal;
- a plurality of level amplifiers connected sequentially in series, the output of each being connected directly to the output of the succeeding amplifier, the first amplifier of said series being connected directly to said input terminal;
- said plurality of level amplifiers corresponding in number to said plurality of variable gain amplifier means;
- a plurality of level detecting means, one of each of said plurality of detecting means respectively connected between sequentially corresponding variable gain amplifier means and the level amplifier in said series;
- the last of said variable gain amplifier means being connected to a recording device;
- each of said variable gain amplifier means having at least two selectable predetermined levels of gain;
- each of said level detecting means producing an output signal which is fed to its corresponding variable gain amplifier means for selecting the desired level of gain when the signal amplitude at the detector is less than a predetermined level and for selecting another level of gain when the signal amplitude exceeds a predetermined level.

2. A system for recording a signal having a range of amplitude greater than the response range of the recording medium comprising:
- an input terminal for receiving the signal;
- a plurality of variable gain amplifier means connected sequentially in series, the first variable gain amplifier means of said series being connected directly to said input terminal;
- a plurality of level amplifiers connected sequentially in series, the output of each being connected directly to the input of the succeeding amplifier, the first amplifier of said series being connected directly to said input terminal;
- said plurality of level amplifiers corresponding in number to said plurality of variable gain amplifier means;
- a plurality of level detecting means, one of each of said plurality of level detecting means respectively connected between sequentially corresponding variable gain amplifier means and the level amplifier in said series;
- each of said level detecting means including an alternating current detector connected to said input terminal through its respective level amplifiers;
- a direct current amplifier connected to said alternating current detector;
- a direct current detector connected to said direct current amplifier and to its respective variable gain amplifier to select the desired gain level of said variable gain amplifier means;
- the last of said variable gain amplifiers means being connected to a recording device;
- each of said variable gain amplifier means having at least two selectable predetermined levels of gain;
- each of said level detecting means producing an output signal which is fed to its corresponding variable gain amplifier means for selecting the desired level of gain when the signal amplitude at the detector is less than a predetermined level and for selecting another level of gain when the signal amplitude exceeds a predetermined level.

3. A system as claimed in claim 2 in which said direct current detector includes:
- an output stage including a transistor;
- tunnel diode means controlling the conduction of said transistor when a preselected amplitude of the output of the direct current amplifier is reached;
- said tunnel diode being connected to the base electrode of said transistor.

References Cited by the Examiner

UNITED STATES PATENTS 2,930,987 3/60 Groce et al. ............ 330—136

NATHAN KAUFMAN, *Primary Examiner.*

ROY LAKE, *Examiner.*